(12) United States Patent
Tsao et al.

(10) Patent No.: US 11,126,515 B2
(45) Date of Patent: Sep. 21, 2021

(54) DATA RECOVERY METHOD FOR RAID SYSTEM

(71) Applicant: AccelStor Singapore Pte. Ltd., Singapore (SG)

(72) Inventors: Shih-Chiang Tsao, Singapore (SG); Ting-Fang Chien, Singapore (SG)

(73) Assignee: AccelStor Technologies Ltd., Shanghai (CN)

( * ) Notice: Subject to any disclaimer, the term of this patent is extended or adjusted under 35 U.S.C. 154(b) by 0 days.

(21) Appl. No.: 16/852,195

(22) Filed: Apr. 17, 2020

(65) Prior Publication Data

US 2020/0334116 A1  Oct. 22, 2020

(30) Foreign Application Priority Data

Apr. 18, 2019  (TW) .................................. 108113680

(51) Int. Cl.
*G06F 11/00* (2006.01)
*G06F 11/20* (2006.01)
*G06F 11/10* (2006.01)

(52) U.S. Cl.
CPC ...... *G06F 11/2094* (2013.01); *G06F 11/1076* (2013.01); *G06F 11/1088* (2013.01); *G06F 11/1092* (2013.01); *G06F 2201/82* (2013.01)

(58) Field of Classification Search
CPC ............. G06F 11/1076; G06F 11/1088; G06F 11/1092
See application file for complete search history.

(56) References Cited

U.S. PATENT DOCUMENTS

| | | | |
|---|---|---|---|
| 7,711,897 B1* | 5/2010 | Chatterjee | G06F 12/0868 711/114 |
| 8,751,862 B2* | 6/2014 | Cherian | G06F 11/1092 714/6.24 |
| 10,496,482 B1* | 12/2019 | Foley | G06F 3/0665 |
| 10,922,177 B2* | 2/2021 | Gong | G06F 11/2094 |
| 2003/0135514 A1* | 7/2003 | Patel | G06F 11/1076 |
| 2013/0124791 A1 | 5/2013 | Flynn et al. | |

(Continued)

FOREIGN PATENT DOCUMENTS

| CN | 100565467 C | 12/2009 | |
|---|---|---|---|
| CN | 101071393 | * 12/2009 | .............. G06F 11/16 |

OTHER PUBLICATIONS

Taiwan Patent Office, 1st Office Action, Patent Application Serial No. TW 108113680, dated Dec. 18, 2019.

(Continued)

*Primary Examiner* — Michael Maskulinski
(74) *Attorney, Agent, or Firm* — Rabin & Berdo, P.C.

(57) ABSTRACT

A data recovery method for a Redundant Array of Independent Disks (RAID) system is provided. The RAID system includes a plurality of drives and a processor. Each drive includes a plurality of data pages. The drives form a plurality of data strips over the drives through stripping processing. Each data strip includes one of the data pages of every drive. The processor writes data to the data strips in a log-based manner and records whether each data page of each data strip is valid or invalid. During recovery of data from a broken one of the drives, data is recovered from a corresponding valid or written data page but is not recovered from a corresponding invalid or blank data page.

1 Claim, 6 Drawing Sheets

(56) References Cited

U.S. PATENT DOCUMENTS

2013/0173955 A1    7/2013  Hallak et al.
2015/0286531 A1*  10/2015  Bondurant .......... G06F 11/1088
                                              714/6.23
2019/0188099 A1*   6/2019  Roberts ............... G06F 11/1092

OTHER PUBLICATIONS

Taiwan Patent Office, 2nd Office Action, Patent Application Serial No. TW 108113680, dated Mar. 12, 2020.

* cited by examiner

DATA RECOVERY METHOD FOR RAID SYSTEM

CROSS-REFERENCE TO RELATED APPLICATION

This non-provisional application claims priority under 35 U.S.C. § 119(a) to Patent Application No. 108113680 filed in Taiwan, R.O.C. on Apr. 18, 2019, the entire contents of which are hereby incorporated by reference.

BACKGROUND

Technical Field

The present disclosure relates to a storage technology, and in particular, to a data recovery method for a RAID system.

Related Art

In an existing Redundant Array of Independent Disks (RAID), after a drive is broken, it takes time to read data to calculate parity bits to recover data from the broken drive. The recovered data is then written to a replacement drive. Because the drives have large capacities, it will take a substantial time to read data from and write data to the drives. With existing solid-state drives (SSD), the time of reading and writing data is reduced, and a maximum read/write speed may be up to 500 MB/s. However, for example, if the capacity of a single drive is 2 TB, it still takes about one hour to read and write data.

SUMMARY

An embodiment of the present disclosure provides a data recovery method for a RAID system. The RAID system includes a plurality of drives, and each drive includes a plurality of data pages. The drives form a plurality of data strips over the drives through stripping processing. Each data strip includes one of the data pages of every drive. Data is written to the data strips in a log-based manner. Data is recovered from a broken one of the drives in the data recovery method. The data recovery method includes: recognizing whether a data page of the broken drive is blank; performing calculation according to parity check to recover data from the data pages of the broken drive; and recovering data from a written data page, and skipping a blank data page.

Another embodiment of the present disclosure provides a data recovery method for a RAID system. The RAID system includes a first RAID and a second RAID. Each of the first RAID and the second RAID includes a plurality of drives. Each drive includes a plurality of data pages. The drives form a plurality of data strips over the drives through stripping processing. Each data strip includes one of the data pages of every drive. Data is written to the data strips in a log-based manner. Data is recovered from a broken drive in the first RAID in the data recovery method. The data recovery method includes: recognizing whether a data page of the broken drive is valid; performing calculation according to parity check to recover data from the data pages of the broken drive; and recovering data from a valid data page, and skipping an invalid data page and a blank data page.

Still another embodiment of the present disclosure provides a data recovery method for a RAID system. The RAID system includes a first RAID and a second RAID that are mirrors of each other, each of the first RAID and the second RAID includes a plurality of drives, and each drive includes a plurality of data pages. The drives form a plurality of data strips over the drives through stripping processing. Each data strip includes one of the data pages of every drive. Data is written to the data strips in a log-based manner. Data is recovered from a plurality of broken drives in the first RAID in the data recovery method. The data recovery method includes: recognizing whether a data page corresponding to the broken drives is valid; reading the drives corresponding to the broken drives in the second RAID; and recovering data from a valid data page, and skipping an invalid data page and a blank data page.

In conclusion, the RAID system and the data recovery method for same provided in the embodiments of the present disclosure can reduce data recovery time.

BRIEF DESCRIPTION OF THE DRAWINGS

The present disclosure will become more fully understood from the detailed description given herein below for illustration only, and thus are not limitative of the present disclosure, and where.

DETAILED DESCRIPTION

Figure 1:
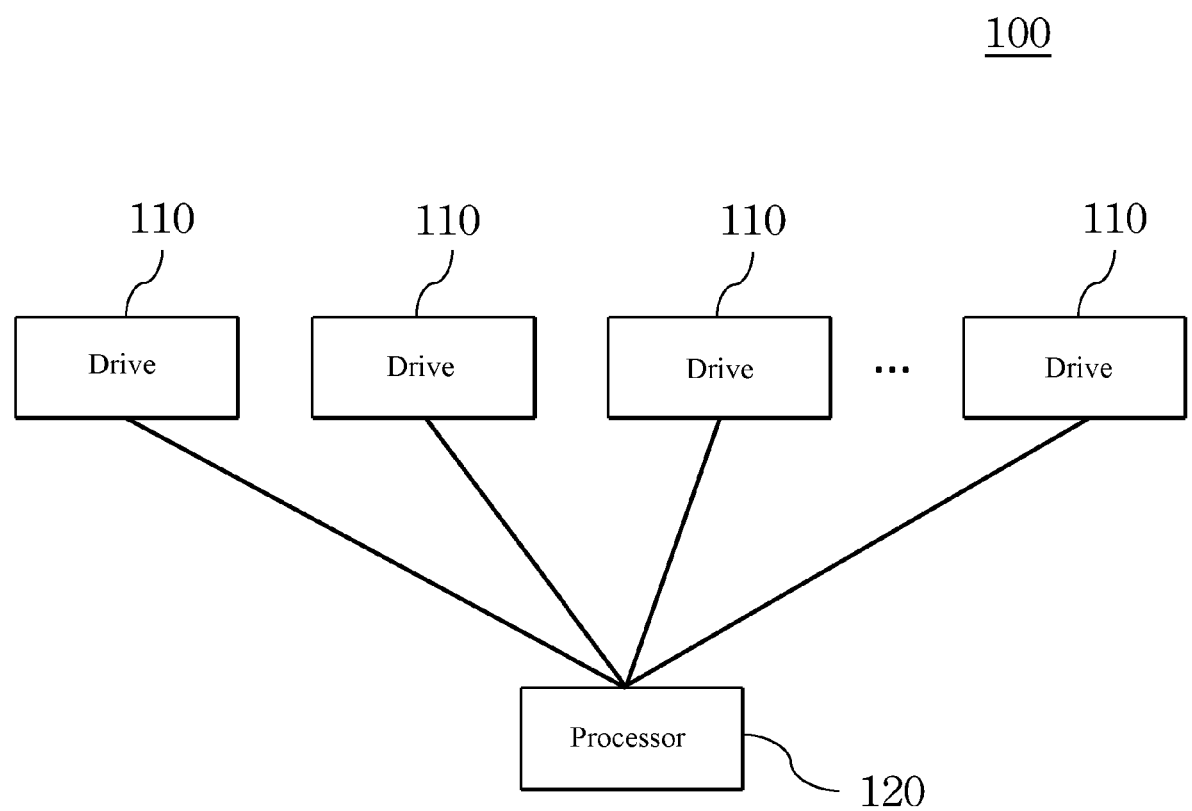
FIG. 1 is a schematic architectural diagram of a RAID system according to a first embodiment of the present disclosure.

FIG. 1 is a schematic architectural diagram of a RAID system 100 according to a first embodiment of the present disclosure. The RAID system 100 includes a plurality of drives 110 and a processor 120 connected to the drives 110, and in addition further includes an access interface, a memory, and the like. Details are not described herein. The drive 110 may be a conventional hard disk drive (HDD) or an SSD. The processor 120 is a processing unit capable of executing computer instructions and performing operations.

Referring to Table 1, a RAID that is formed by eight drives 110 (D1 to D8) is used for description. Herein, for example, the RAID is a RAID level 4. However, the present invention is not limited thereto. The drives 110 may be alternatively applied to a RAID level 5 or even a RAID level 6. Herein, the drive D8 is a parity drive. The drives D1 to D8 form a plurality of data strips over the drives D1 to D8 through stripping processing. Herein, six data strips are used as an example for description. Data strips S1 and S2 have data, and data strips S3 to S6 are blank. Each drive 110 includes a plurality of data pages, and one data page is represented as one field in Table 1. Data (d1 to d14) is written to the data strips S1 and S2 in a log-based manner. During writing, it is assumed that each corresponding data strip S1 or S2 includes one of the data pages of every drive 110, and each data page of non-parity drives 110 (that is, the drives D1 to D7) corresponds to one validity value (v indicates that the validity value is valid, and i indicates that the validity value is invalid). The data strip S1 includes: one data page (the data d1 is stored, and a validity value is valid) of the drive D1, one data page (the data d2 is stored, and a validity value is valid) of the drive D2, one data page (the data d3 is stored, and a validity value is invalid) of the drive D3, one data page (the data d4 is stored, and a validity value is invalid) of the drive D4, one data page (the data d5 is stored, and a validity value is invalid) of the drive D5, one data page (the data d6 is stored, and a validity value is invalid) of the drive D6, one data page (the data d7 is stored, and a validity value is invalid) of the drive D7, and one data page (a parity bit p1 is stored) of the drive D8. The data strip S2 includes: one data page (the data d8 is stored, and a validity value is valid) of the drive D1, one data page (the data d9 is stored, and a validity value is invalid) of the drive D2, one data page (the data d10 is stored, and a validity value is invalid) of the drive D3, one data page (the data d11 is stored, and a validity value is invalid) of the drive D4, one data page (the data d12 is stored, and a validity value is invalid) of the drive D5, one data page (the data d13 is stored, and a validity value is invalid) of the drive D6, one data page (the data d14 is stored, and a validity value is invalid) of the drive D7, and one data page (a parity bit p2 is stored) of the drive D8. It should be noted that the validity values are not stored on the drives 110, but instead are stored on another storage medium, for example, a memory connected to the processor 120. In an embodiment, the validity values are stored in the form of a mapping table. The mapping table records whether the validity value corresponding to each data page is valid or invalid. If the mapping table does not have a validity value corresponding to one or some data pages, it indicates that no data has been written to the data page or the data pages. To be specific, the data page or the data pages are blank pages. Herein, validity values are noted together in Table 1 and subsequent tables for ease of reading only, and it does not mean that the validity values are stored on the data pages.

TABLE 1

|    | D1   | D2   | D3    | D4    | D5    | D6    | D7    | D8 |
|----|------|------|-------|-------|-------|-------|-------|----|
| S1 | d1/v | d2/v | d3/i  | d4/i  | d5/i  | d6/i  | d7/i  | p1 |
| S2 | d8/v | d9/i | d10/i | d11/i | d12/i | d13/i | d14/i | p2 |
| S3 |      |      |       |       |       |       |       |    |
| S4 |      |      |       |       |       |       |       |    |
| S5 |      |      |       |       |       |       |       |    |
| S6 |      |      |       |       |       |       |       |    |

Figure 4:
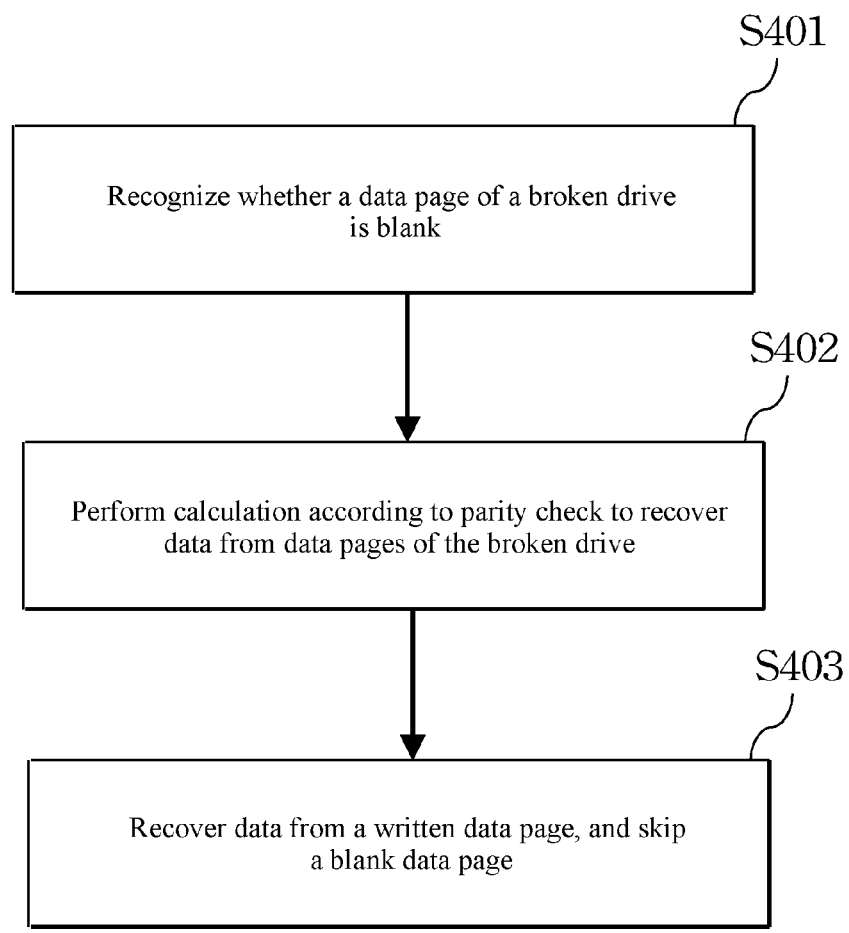
FIG. 4 is a flowchart of a data recovery method for a RAID system according to a first embodiment of the present disclosure.

FIG. 4 is a flowchart of a data recovery method applied to the RAID system 100 according to a first embodiment of the present disclosure. First, in step S401, it is recognized whether a data page of a broken drive D2 obtained through recovery is blank. Specifically, the foregoing mapping table is searched to find whether there is a data page for which a validity value is not recorded. Referring to Table 2, for example, the drive D2 is broken. After the broken drive D2 is removed and replaced with a replacement drive D2', the processor 120 may calculate a parity bit p1 according to parity check to recover data d2 stored on a data page of the original D2' (step S402). In step S403, data is recovered from a written data page, including a valid data page and an invalid data page; and a blank data page is skipped. Therefore, data d9 that is on the drive D2 and on a data strip S2 is also recovered. In an embodiment, in step S402, calculation is performed according to parity check on only a data strip that includes a data page from which data needs to be recovered. In another embodiment, calculation may be alternatively performed according to parity check on all the data strips.

TABLE 2

|    | D1   | D2'  | D3    | D4    | D5    | D6    | D7    | D8 |
|----|------|------|-------|-------|-------|-------|-------|----|
| S1 | d1/v | d2/v | d3/i  | d4/i  | d5/i  | d6/i  | d7/i  | p1 |
| S2 | d8v  | d9/i | d10/i | d11/i | d12/i | d13/i | d14/i | p2 |
| S3 |      |      |       |       |       |       |       |    |
| S4 |      |      |       |       |       |       |       |    |
| S5 |      |      |       |       |       |       |       |    |
| S6 |      |      |       |       |       |       |       |    |

In this example, the used data recovery time is a sum of a data read time and a data write time (if a drive replacement time and a parity bit calculation time are not considered). The data read time is $(W*D/D)T_R$. W is a quantity of written data pages of the broken drive D2, D is a quantity of non-parity drives 110, and $T_R$ is a time it takes a drive to read data from one data page. Because the drives 110 can be read simultaneously, there is division by D. Herein, the data read time is $2T_R$. The data write time is $W*T_W$, where $T_W$ is a time it takes a drive to write data to one data page. Herein, the data write time is $2T_W$. Assuming that $T_R$ and $T_W$ are the same (and are denoted by T), the used data recovery time is 4T. Compared with a conventional recovery manner in which data on all the data pages (for example, six data pages) of the broken drive D2 is recovered and the used time is $6T_R+6T_W$ (that is, 12T), 66.67% of the time is saved.

Referring to Table 6, in some embodiments, the RAID system 100 further includes at least one hot spare drive. Herein, two hot spare drives DS1 and DS2 are used as an example.

TABLE 6

|    | D1   | D2   | D3    | D4    | D5    | D6    | D7    | D8 | DS1 | DS2 |
|----|------|------|-------|-------|-------|-------|-------|----|-----|-----|
| S1 | d1/v | d2/v | d3/i  | d4/i  | d5/i  | d6/i  | d7/i  | p1 |     |     |
| S2 | d8/v | d9/i | d10/i | d11/i | d12/i | d13/i | d14/i | p2 |     |     |
| S3 |      |      |       |       |       |       |       |    |     |     |
| S4 |      |      |       |       |       |       |       |    |     |     |
| S5 |      |      |       |       |       |       |       |    |     |     |
| S6 |      |      |       |       |       |       |       |    |     |     |

Referring to Table 7, for example, the drive D2 is broken. Herein, the broken drive D2 does not need to be replaced. In this embodiment, the to-be-recovered data d2 and the to-be-recovered data d9 are recovered to the hot spare drives DS1 and DS2. Herein, the to-be-recovered data on the data pages is evenly written to the hot spare drives DS1 and DS2. Therefore, on a data strip S1, the hot spare drive DS1 stores the data d2, and the hot spare drive DS2 stores the data d9. In this example, the used data recovery time is a sum of a data read time and a data write time (if a parity bit calculation time is not considered). The data read time is $(W*D/D)T_R$. Herein, the data read time is $2T_R$. The data write time is $(W/Ds)T_W$, and Ds is a quantity of hot spare drives. Herein, the data write time is one $T_W$. Assuming that $T_R$ and $T_W$ are the same (and are denoted by T), the used data recovery time is 3T. Compared with the first embodiment, 25% of the time is further saved. In some embodiments, the to-be-recovered data d2 and the to-be-recovered data d9 on the same broken drive may be alternatively written to one of the hot spare drives.

TABLE 7

|    | D1   | D2 | D3    | D4    | D5    | D6    | D7    | D8  | DS1  | DS2  |
|----|------|----|-------|-------|-------|-------|-------|-----|------|------|
| S1 | d1/v |    | d3/i  | d4/i  | d5/i  | d6/i  | d7/i  | p1' | d2/v | d9/i |
| S2 | d8/v |    | d10/i | d11/i | d12/i | d13/i | d14/i | p2  |      |      |
| S3 |      |    |       |       |       |       |       |     |      |      |
| S4 |      |    |       |       |       |       |       |     |      |      |
| S5 |      |    |       |       |       |       |       |     |      |      |
| S6 |      |    |       |       |       |       |       |     |      |      |

Figure 2:
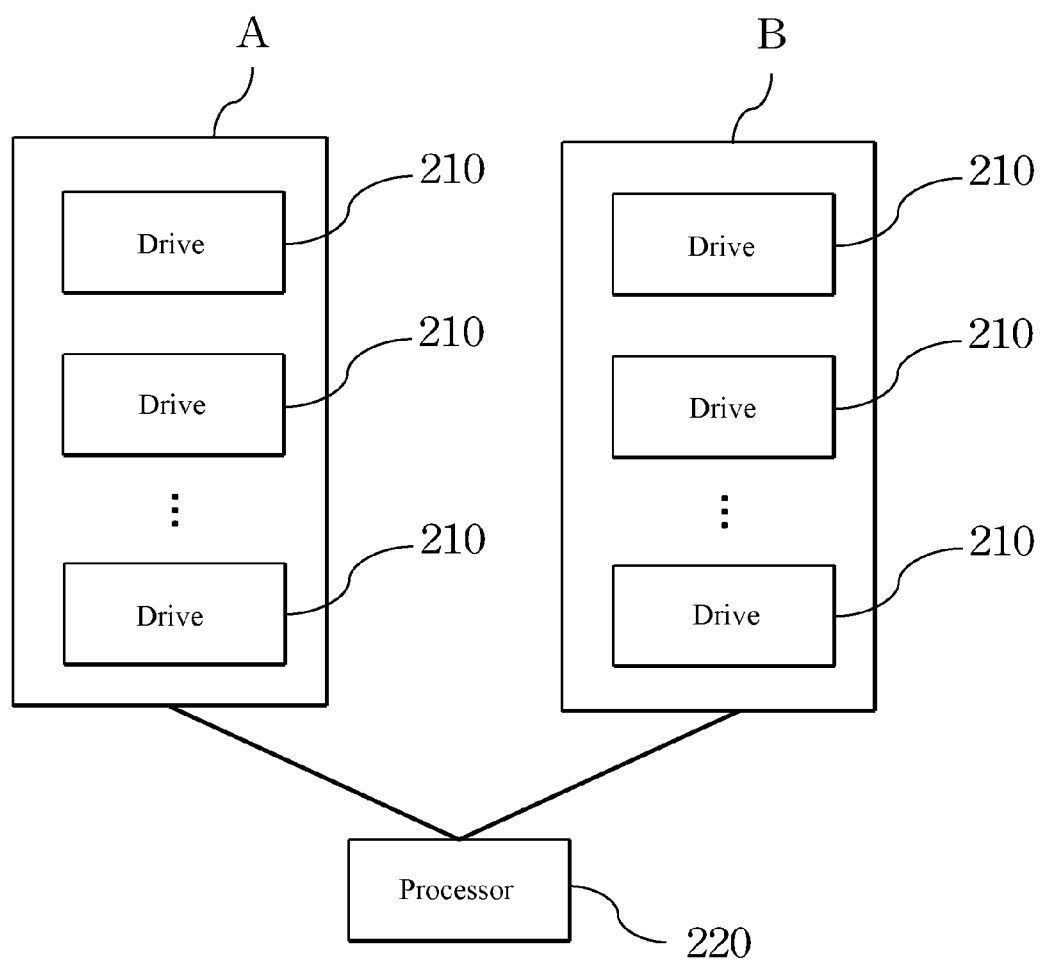
FIG. 2 is a schematic architectural diagram of a RAID system according to a second embodiment of the present disclosure.

FIG. 2 is a schematic architectural diagram of a RAID system 200 according to a second embodiment of the present disclosure. The RAID system 200 includes a plurality of drives 210 and a processor 220 connected to the drives 210, and in addition further includes an access interface, a memory, and the like. Details are not described herein. The drive 210 may be a conventional HDD or an SSD. The processor 220 is a processing unit capable of executing computer instructions and performing operations. Herein, the drives 210 are grouped into two groups, one group of drives 210 form a first RAID A, and the other group of drives 210 form a second RAID B.

Referring to Table 3, one RAID that is formed by eight drives 210 (D1 to D8) and one RAID that is formed by eight drives 210 (D9 to D16) are used for description. Herein, for stripping and log-based writing in a RAID, refer to the description of the foregoing first embodiment. Details are not repeated herein again. Data is stored on data strips S1 and S2 in the first RAID A, and data is stored on a data strip S7 of the second RAID B.

TABLE 3

First RAID A

|    | D1   | D2   | D3    | D4    | D5    | D6    | D7    | D8 |
|----|------|------|-------|-------|-------|-------|-------|----|
| S1 | d1/v | d2/v | d3/i  | d4/i  | d5/i  | d6/i  | d7/i  | p1 |
| S2 | d8/v | d9/i | d10/i | d11/i | d12/i | d13/i | d14/i | p2 |
| S3 |      |      |       |       |       |       |       |    |
| S4 |      |      |       |       |       |       |       |    |
| S5 |      |      |       |       |       |       |       |    |
| S6 |      |      |       |       |       |       |       |    |

Second RAID B

|     | D9    | D10   | D11   | D12   | D13   | D14   | D15   | D16 |
|-----|-------|-------|-------|-------|-------|-------|-------|-----|
| S7  | d15/i | d16/i | d17/v | d18/i | d19/v | D20/i | D21/v | P7  |
| S8  |       |       |       |       |       |       |       |     |
| S9  |       |       |       |       |       |       |       |     |
| S10 |       |       |       |       |       |       |       |     |
| S11 |       |       |       |       |       |       |       |     |
| S12 |       |       |       |       |       |       |       |     |

Figure 5:
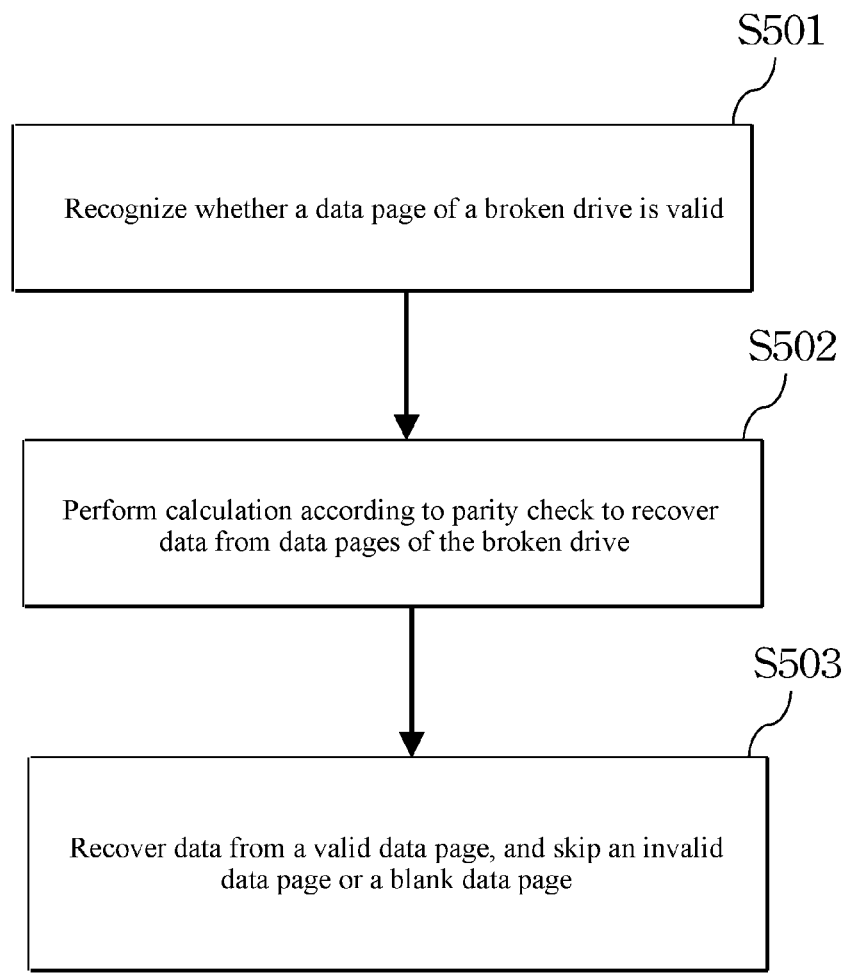
FIG. 5 is a flowchart of a data recovery method for a RAID system according to a second embodiment of the present disclosure.

FIG. 5 is a flowchart of a data recovery method applied to the RAID system 200 according to a second embodiment of the present disclosure. Similar to the foregoing embodiments, validity values corresponding to related data pages are stored in an area other than the drives 210 (for example, stored in a memory connected to the processor 220 in the form of a mapping table). In step S501, validity values corresponding to data pages of the broken drive D2 in the mapping table are viewed, so that it can be recognized which data page of the broken drive D2 is valid. Referring to Table 4, for example, the drive D2 is broken. After the broken drive D2 is removed and replaced with a replacement drive D2', in step S502, parity bits p1 and p2 are calculated according to parity check to recover data from the data pages of the broken drive D2. In step S503, data is recovered from a valid data page, and an invalid data page or a blank data page is skipped. Herein, data d2 exists on a valid data page of the broken drive D2. In an embodiment, in step S502, calculation is performed according to parity check on only a data strip that includes a valid data page from which data needs to be recovered. In another embodiment, calculation may be alternatively performed on all the data strips according to parity check.

In the second embodiment, the recovered data d2 is not stored on the replacement drive D2', but instead, data on the valid data page is recovered in the second RAID B. For example, the data d2 is written to a data page of the drive D9 on a data strip S8. Herein, the remaining valid data pages in the first RAID A are also copied onto the second RAID B. Herein, the valid data pages are still sequentially written in a log-based writing manner. The valid data page of the broken drive D2 is written first, and the valid data pages of the remaining drives 210 are then written. After the data on the data pages is written, the processor 220 similarly calculates a corresponding parity bit p8. In addition, after data on all the valid data pages in the first RAID A has been written to the second RAID B, the processor 220 erases the first RAID A (that is, clears all the data pages in the first RAID A).

TABLE 4

First RAID A

|    | D1 | D2' | D3 | D4 | D5 | D6 | D7 | D8 |
|----|----|-----|----|----|----|----|----|----|
| S1 |    |     |    |    |    |    |    |    |
| S2 |    |     |    |    |    |    |    |    |
| S3 |    |     |    |    |    |    |    |    |
| S4 |    |     |    |    |    |    |    |    |
| S5 |    |     |    |    |    |    |    |    |
| S6 |    |     |    |    |    |    |    |    |

Second RAID B

|     | D9    | D10   | D11   | D12   | D13   | D14   | D15   | D16 |
|-----|-------|-------|-------|-------|-------|-------|-------|-----|
| S7  | d15/i | d16/i | d17/v | d18/i | d19/v | D20/i | D21/v | p7  |
| S8  | d2/v  | d1/v  | d8/v  |       |       |       |       | p8  |
| S9  |       |       |       |       |       |       |       |     |
| S10 |       |       |       |       |       |       |       |     |
| S11 |       |       |       |       |       |       |       |     |
| S12 |       |       |       |       |       |       |       |     |

In this example, the used data recovery time is a sum of a data read time and a data write time (if a drive replacement time, a page erasure time, and a parity bit calculation time are not considered). The data read time is $(N*D/D)T_R+(M/D)$, N is a quantity of valid data pages of the broken drive D2, D is a quantity of non-parity drives 210, and M is a quantity of the remaining valid data pages of the first RAID A. Herein, the data read time is $(1+\frac{2}{7})T_R$. The data write time is $((N+M)/D)T_W$. Because the drives 110 can be read and written simultaneously, there is division by D. Herein, the data write time is $(\frac{3}{7})T_W$. Assuming that $T_R$ and $T_W$ are the same (and are denoted by T), the used data recovery time is 1.71 T. More time is saved compared with the used time 4T in the first embodiment. Herein, because the quantity of valid data pages is relatively small, the time used in the second embodiment is shorter than that in the first embodiment.

In some embodiments, if data on a relatively large quantity of data pages needs to be recovered, the approach in the first embodiment (that is, the to-be-recovered data on the data pages is recovered to a replacement drive) uses a relatively short time and is adopted. In other words, before a recovery action is performed, the approach in the embodiment that uses a relatively short time is used to perform recovery. Specifically, according to the approach in the first embodiment, the to-be-recovered data on the data pages is written back to the replacement drive, the data read time is $(N*D/D)T_R$, and the data write time is $N*T_W$. Assuming that $T_R$ and $T_W$ are the same (and are denoted by T), according to the approach in the first embodiment, the used data recovery time is 2NT, and according to the approach in the foregoing second embodiment, the used data recovery time is $(N+(N+2M)/D)T$. That is, when $(N+2M)/D>N$, the approach in the first embodiment is adopted, or otherwise, the approach in the second embodiment is adopted.

Figure 3:
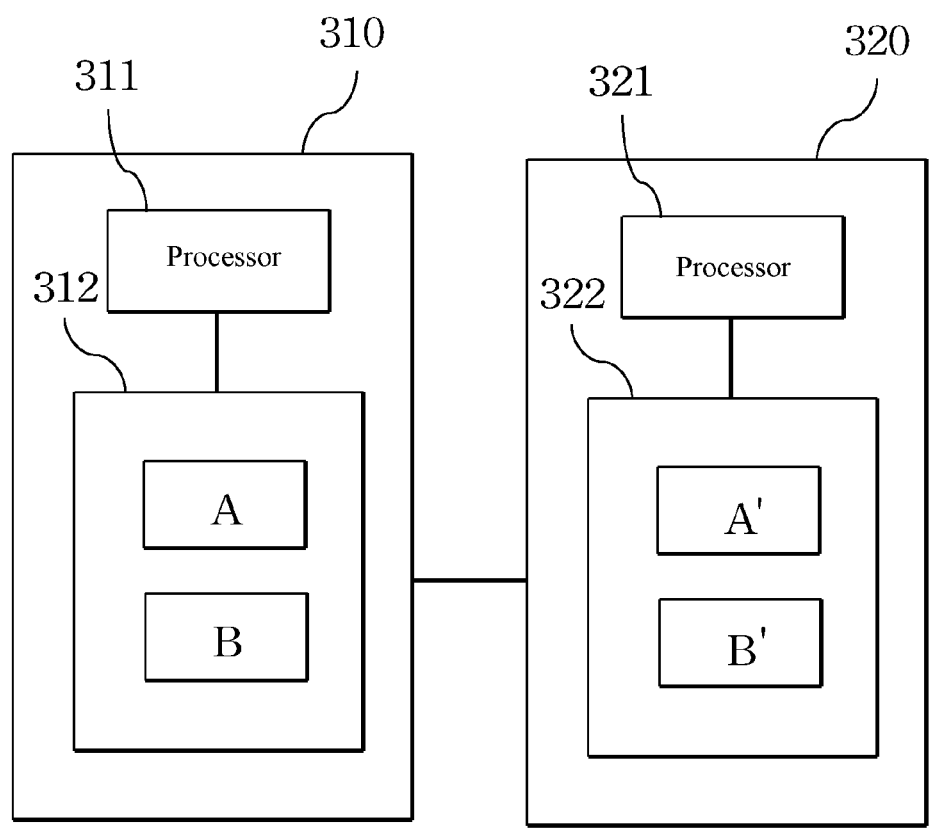
FIG. 3 is a schematic architectural diagram of a RAID system according to a third embodiment of the present disclosure.

FIG. 3 is a schematic architectural diagram of a RAID system 300 according to a third embodiment of the present disclosure. The RAID system 300 is a high availability (HA) cluster. That is, the RAID system 300 includes a first RAID 310 and a second RAID 320 that are mirrors of each other. The first RAID 310 include a first data pool 312 and a processor 311 connected to the first data pool 312. The first data pool 312 includes the foregoing first RAID A and second RAID B. Therefore, the stored data is the same as that listed in Table 3. The second RAID 320 includes a second data pool 322 and a processor 321 connected to the second data pool 322. The second data pool 322 includes a first RAID A' that stores data the same as that in the first RAID A, and a second RAID B' that stores data the same as that in the second RAID B. The data is therefore not otherwise listed. In some embodiments, each of the first data pool 312 and the second data pool 322 may alternatively include only one RAID. In some embodiments, each of the first data pool 312 and the second data pool 322 may alternatively include more than two RAIDs.

Figure 6:
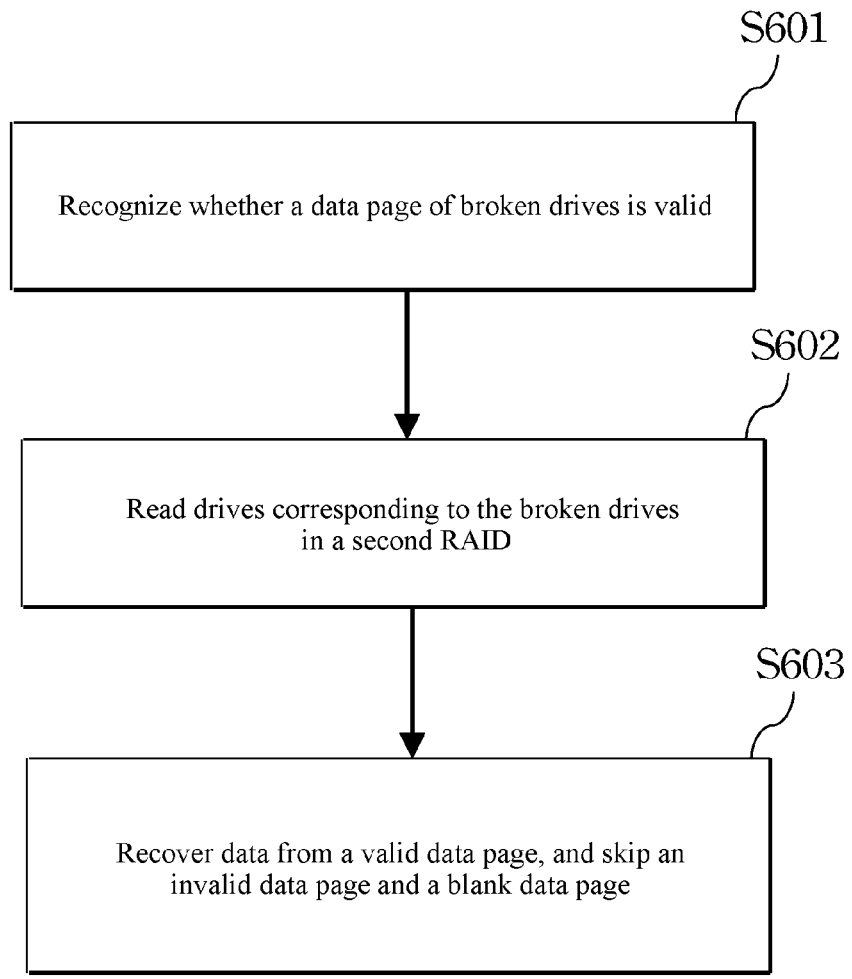
FIG. 6 is a flowchart of a data recovery method for a RAID system according to a third embodiment of the present disclosure.

FIG. 6 is a flowchart of a data recovery method applied to the RAID system 300 according to a third embodiment of the present disclosure. Referring to Table 5, for example, drives D1 and D2 are broken. The broken drives D1 and D2 are removed and replaced with replacement drives D1' and D2'. Similar to the foregoing embodiments, validity values corresponding to related data pages are stored in an area other than the drives (for example, validity values of a first data pool 312 are stored in a mapping table on a memory connected to a processor 311; and validity values of a second data pool 322 are stored in a mapping table on a memory connected to the processor 321). In step S601, it is recognized whether a data page of the broken drives D1 and D2 is valid. Specifically, validity values of corresponding data pages recorded in the mapping tables may be viewed to recognize whether a validity value of the data page of the broken drives D1 and D2 is valid. Different from that a parity bit is calculated to recover data in the second embodiment, in step S602, the drives corresponding to the broken drives D1 and D2 in a second RAID 320 are read to obtain the data pages of the broken drives D1 and D2. In step S603, data is recovered (that is, written) from a valid data page to a corresponding first RAID 310. Herein, similar to the foregoing second embodiment, an invalid data page and a blank data page are also skipped. Similar to the foregoing embodiments, after data is recovered, a corresponding parity bit p1' is also calculated. In addition, before data is recovered from the data pages, a first RAID A is erased first (that is, all the data pages in the first RAID A are cleared).

TABLE 5

| First RAID A | | | | | | | | |
|---|---|---|---|---|---|---|---|---|
| | D1' | D2' | D3 | D4 | D5 | D6 | D7 | D8 |
| S1 | d1/v | d2/v | d8/v | | | | | p1' |
| S2 | | | | | | | | |
| S3 | | | | | | | | |
| S4 | | | | | | | | |
| S5 | | | | | | | | |
| S6 | | | | | | | | |

| Second RAID B | | | | | | | | |
|---|---|---|---|---|---|---|---|---|
| | D9 | D10 | D11 | D12 | D13 | D14 | D15 | D16 |
| S7 | d15/i | d16/i | d17/v | d18/i | d19/v | D20/i | D21/v | p7 |
| S8 | | | | | | | | |
| S9 | | | | | | | | |
| S10 | | | | | | | | |
| S11 | | | | | | | | |
| S12 | | | | | | | | |

In this example, the used data recovery time is a sum of a data read time and a data write time (if a drive replacement time and a page erasure time are not considered). The data read time is $(N/B)T_R+(M/(D-B))T_R$, N is a quantity of valid data pages of the broken drives D1 and D2, M is a quantity of valid data pages of the remaining drives in the first RAID A, B is a quantity of broken drives, and D is a quantity of non-parity drives. Herein, the data read time is $(2/2)T_R+(1/5)T_R$, that is, $1.2T_R$. The data write time is $(N/B)T_W+(M/(D-B))T_W$. Herein, the data read time is $1.2T_W$. Assuming that $T_R$ and $T_W$ are the same (and are denoted by T), and the used data recovery time is 2.4T. In the third embodiment, the time for calculating a parity bit to perform recovery is not required, and recovery can be performed when a plurality of drives is broken.

In conclusion, the RAID system and the data recovery method for same provided in the embodiments of the present disclosure can reduce data recovery time.

What is claimed is:

1. A data recovery method for a Redundant Array of Independent Disks (RAID) system, the RAID system including
a first RAID and a second RAID, wherein
each of the first RAID and the second RAID comprises a plurality of drives,
each drive comprises a plurality of data pages,
the drives form a plurality of data strips over the drives through stripping processing,
each data strip comprises one of the data pages of every drive,
data is written to the data strips in a log-based manner, and
data is recovered from a broken drive in the first RAID in the data recovery method, the data recovery method comprising:
recognizing whether a data page of the broken drive is valid;
performing calculation according to parity check to recover data from the data pages of the broken drive; and
recovering data from a valid data page, and skipping an invalid data page and a blank data page,
wherein if $(N+2M)/D>N$, the recovering data from a valid data page is recovering the data to a replacement drive in the first RAID, or otherwise, recovering the data in the second RAID and copying the remaining valid data pages of the first RAID onto the second RAID, wherein N is a quantity of valid data pages of the broken drive, M is a quantity of the remaining valid data pages of the first RAID, and D is a quantity of non-parity drives separately comprised in the first RAID and the second RAID.

* * * * *